United States Patent [19]

Lauw et al.

[11] Patent Number: 5,785,745
[45] Date of Patent: Jul. 28, 1998

[54] AMPHIPHILIC DYES

[75] Inventors: Hiang P. Lauw; John R. Moffatt, both of Corvallis, Oreg.

[73] Assignee: Hewlett-Packard Company, Palo Alto, Calif.

[21] Appl. No.: 742,137

[22] Filed: Oct. 31, 1996

[51] Int. Cl.[6] ................................... C09D 11/02
[52] U.S. Cl. ..................... 106/31.27; 106/31.43; 106/31.47; 106/31.57; 106/31.58; 106/31.59
[58] Field of Search ................ 106/31.27, 31.43, 106/31.47, 31.57, 31.58, 31.59

[56] References Cited

U.S. PATENT DOCUMENTS

| | | | |
|---|---|---|---|
| 4,664,708 | 5/1987 | Allen | 106/31.43 |
| 4,836,851 | 6/1989 | Pawlowski et al. | 106/31.43 |
| 5,102,459 | 4/1992 | Ritter et al. | 106/31.36 |
| 5,116,409 | 5/1992 | Moffatt | 106/22 |
| 5,145,518 | 9/1992 | Winnik et al. | 106/21 |
| 5,342,439 | 8/1994 | Lauw | 106/31.59 |
| 5,534,052 | 7/1996 | Mennicke et al. | 106/31.43 |

*Primary Examiner*—Helene Klemanski

[57] ABSTRACT

Color bleed is alleviated between ink-jet inks by employing amphiphilic dyes. Amphiphilic dyes comprise a reactive dye covalently bonded to a hydrophobe. The amphiphilic dye, together with an aqueous liquid vehicle, form an ink-jet ink that evidences reduced color bleed and an improvement in overall print quality deriving from the micellization of the amphiphilic dye molecules. The reactive dye typically comprises any of the reactive dyes commonly employed in ink-jet printing, and the aqueous liquid vehicle typically comprises at least one organic solvent and water. The hydrophobe may be any compound compatible with the components in an ink-jet ink composition and may be an ionic amphiphile or a pH-sensitive or insensitive zwitterionic and non-ionic amphiphile.

22 Claims, No Drawings

AMPHIPHILIC DYES

TECHNICAL FIELD

The present invention relates to ink-jet printing, and, more particularly, to improving print quality by employing a colorant comprising a reactive dye covalently linked to a hydrophobe.

BACKGROUND ART

Ink-jet printing is a non-impact printing process in which droplets of ink are deposited on a print medium in a particular order to form alphanumeric characters, area fills, and other patterns thereon. Low cost and high quality of the output, combined with relatively noise-free operation, have made ink-jet printers a popular alternative to other types of printers used with computers.

The non-impact printing process of drop-on-demand ink-jet printing involves the ejection of fine droplets of ink onto a print media such as paper, transparency film, or textiles in response to electrical signals generated by a microprocessor. There are two basic means currently available for achieving ink droplet ejection in ink-jet printing: thermally and piezo-electrically. In thermal ink-jet printing, the energy for drop ejection is generated by electrically-heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezo-electric crystals, again, in response to electrical signals generated by the microprocessor.

In commercially-available thermal ink-jet color printers, such as a DeskJet® printer available from Hewlett-Packard Company, a color spectrum is achieved by combining yellow, magenta, and cyan inks in various proportions. The yellow, magenta, and cyan inks derive their hues from yellow, magenta, and cyan colorants, respectively.

Colorants for inks are available in the form of dyes or pigments. Accordingly, ink-jet inks are available as either dye-based or pigment-based compositions. Of the two, dye-based ink-jet ink compositions are much more widely available. Dye-based ink-jet ink compositions are generally formulated by dissolving water-soluble dye in an aqueous-based ink vehicle. The dye molecules employed in ink-jet ink compositions are often in the form of dye salts made of a dye anion and a cation such as sodium or tetramethylammonium (TMA). Dye-based ink-jet inks may exhibit problems such as poor waterfastness, poor lightfastness, dye crystallization, ink bleeding, and clogging of the jetting channels as a result of solvent evaporation, among other problems.

With specific regard to the problem of bleed, bleed is defined herein as the invasion of one color into another color on paper, which is a surface phenomenon. Bleed is evidenced by a ragged border between colors on a print medium. Various solutions to the problem of bleed have been proffered. Some solutions involve changing the ink environment to reduce bleed. For instance, heated platens and other heat sources, along with specially-formulated paper, have been employed to reduce bleed. However, heated platens add cost to the printer, and specially-formulated paper is more expensive than "plain" paper. Thus, using external paraphernalia to reduce bleed in ink-jet color printing is generally not cost effective.

Other proposed solutions involve changing the composition of the ink-jet ink composition to reduce bleed. For example, surfactants have been used to reduce bleed. U.S. Pat. No. 5,116,409 (Moffatt), which is assigned to the same assignee as the present invention, discloses employing zwitterionic surfactants or ionic or non-ionic amphiphiles to reduce bleed. Moffatt teaches that the surfactant or amphiphile should be employed in an ink-jet ink composition above its critical micelle concentration (cmc) such that micelles are formed that incorporate dyes therein.

Both dye-based and pigment-based ink-jet inks are plagued by bleed problems. A limited number of pigment-based ink-jet inks are commercially available and generally comprise a pigment dispersed in an aqueous solution by a dispersant. Although pigments offer the very desirable properties of waterfastness, lightfastness, and reduced image feathering, their natural tendency to agglomerate in aqueous media, their tendency to settle out from the liquid vehicle, and their lack of uniform size distribution have dampened industry enthusiasm for their employment in ink-jet ink compositions in comparison to dye-based inks. Further, inks containing pigment particles may clog the narrow orifices of a printhead, thereby adversely affecting print quality.

In an attempt to capitalize upon the respective benefits of dyes and pigments while minimizing their above-mentioned disadvantages, U.S. Pat. No. 5,145,518 (Winnik et al) teaches ink compositions comprising an aqueous liquid vehicle and particles of an average diameter of 100 nanometers or less. These particles comprise micelles of block copolymers of the formula ABA, wherein A represents a hydrophilic segment and B represents a hydrophobic segment, and wherein dye molecules are covalently attached to the micelles. The ink compositions of '518 are reportedly exceptionally waterfast and non-threading. However, large block copolymers increase the apparent molecular weight of the colorant, such that less color intensity is achieved for the same weight percent of colorant in the ink.

A need remains for an ink-jet ink composition that exhibits the advantages of both dye-based and pigment-based inks while minimizing their above-described disadvantages. More particularly, the ink-jet ink composition should have good waterfastness and edge acuity characteristics while exhibiting minimal bleed, crystallization, and nozzle-clogging. Additionally, the ink-jet ink composition should comprise a stable, homogenous particulate dispersion with a long shelf life and should be capable of a wide variety of color choices. Finally, the ink-jet ink composition should be substantially non-toxic, non-mutagenic, and easily and inexpensively prepared.

DISCLOSURE OF INVENTION

In view of the foregoing, an ink-jet ink composition and method for reducing bleed are provided which use amphiphilic dyes. The amphiphilic dyes of the present invention comprise a reactive dye that is covalently attached to a hydrophobe. The reactive dye component of the present ink-jet ink compositions may be represented by any dye capable of bonding to a hydrophobe. By definition, commercially-available reactive dyes have such capabilities. Therefore, the print quality attainable with any commercially-available reactive dye may be improved in the practice of the invention.

The hydrophobe employed in the practice of the invention may be any compound that is compatible with the other components in the ink-jet ink composition. Classes of suitable compounds include ionic amphiphiles (anionic and cationic) and pH-sensitive or insensitive zwitterionic and nonionic amphiphiles.

The amphiphilic dye is formed by covalently linking a dye to a hydrophobe. The resulting amphiphilic dye makes micelles, resulting in reduced bleed, crystallization and nozzle-clogging while achieving an improvement in overall print quality evidenced by good waterfastness and good edge acuity. Ink-jet ink compositions including the amphiphilic dye are stable, homogenous particulate dispersions that are capable of long shelf life.

BEST MODES FOR CARRYING OUT THE INVENTION

In accordance with the invention, ink-jet ink compositions are provided which comprise amphiphilic dyes in an aqueous vehicle. The amphiphilic dyes of the present invention comprise a reactive dye that is covalently linked to a hydrophobe. The resulting amphiphilic dye makes micelles, thereby achieving bleed alleviation and an improvement in print quality for the ink-jet ink composition.

All concentrations herein are in weight percent, unless otherwise indicated. The purity of all components is that employed in normal commercial practice for thermal ink-jet inks. At the outset, it is important to note that some ingredients can serve dual functions. For example, n-butyl carbitol can function as a solvent in the aqueous vehicle as well as a hydrophobe covalently bonded to a reactive dye in the practice of the present invention.

In general, the term "reactive dye" refers to a synthetic dye having reactive groups capable of covalently bonding with molecules of fibers. Reactive dyes typically comprise a chromophore soluble in water, such as an anthraquinone, a monoazo dye, or diazo dye, a phthalocyanine, an aza[18] annulene, a formazan copper complex, a triphenodioxazine, and the like, to which a reactive group is attached. In the practice of the invention, the reactive group should have a leaving group X that may undergo nucleophilic displacement by a group in a hydrophobe, such as the hydroxyl group (—OH) of a long-chain alcohol. Thus, the nucleophilic displacement of a leaving group X of a reactive dye molecule with a group of a hydrophobe results in the attachment of the reactive dye to the hydrophobe by means of an ester, ether, amide, or like covalent linkage. It is contemplated that any reactive dye having a reactive group with a leaving group X may benefit from the practice of the invention. Non-exclusive examples of suitable reactive groups are provided below.

A hydrophobe is commonly defined as a compound having a hydrophobic, water-insoluble organic tail. The hydrophobe employed in the practice of the invention may be any compound that is compatible with the other ink-jet ink components. Classes of suitable compounds include ionic amphiphiles (anionic and cationic) and pH-sensitive or insensitive zwitterionic and nonionic amphiphiles. Further, fluorocarbon analogs of such hydrophobes may be suitably employed. Preferably, the hydrophobe is an amine or alcohol with a chain length within the range of 5 to 10 carbon atoms, although the class of appropriate hydrophobes is very large, as evidenced by the large number of non-exclusive examples provided below. Preferably, the amphiphilic dye comprises Reactive Black 5 covalently attached to pentylamine in dimer form.

The reaction of CI Reactive Black 5 with pentyl amine is shown below.

CI Reactive Black 5 Reaction with Pentyl Amine

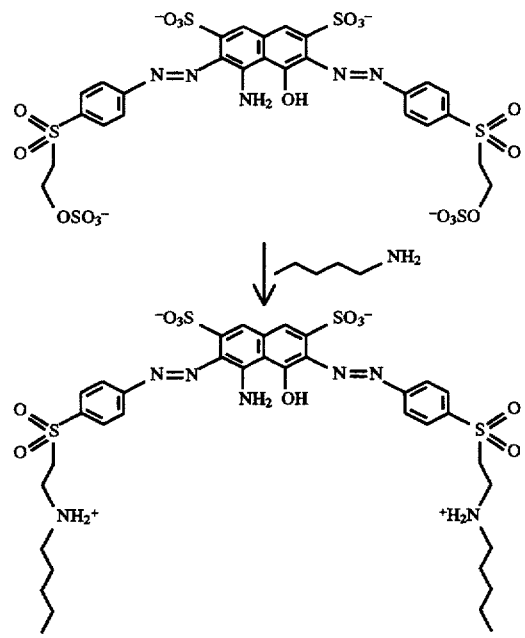

Additional examples of amphiphilic dyes in accordance with the invention are provided below, with the reactive dye component being Reactive Orange 16, Reactive Blue 4, Reactive Red 4, and Reactive Black 5, respectively, and the hydrophobe component represented in each case as group R:

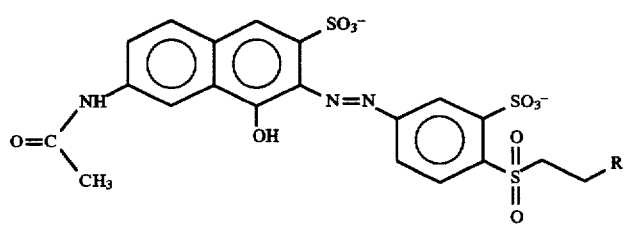

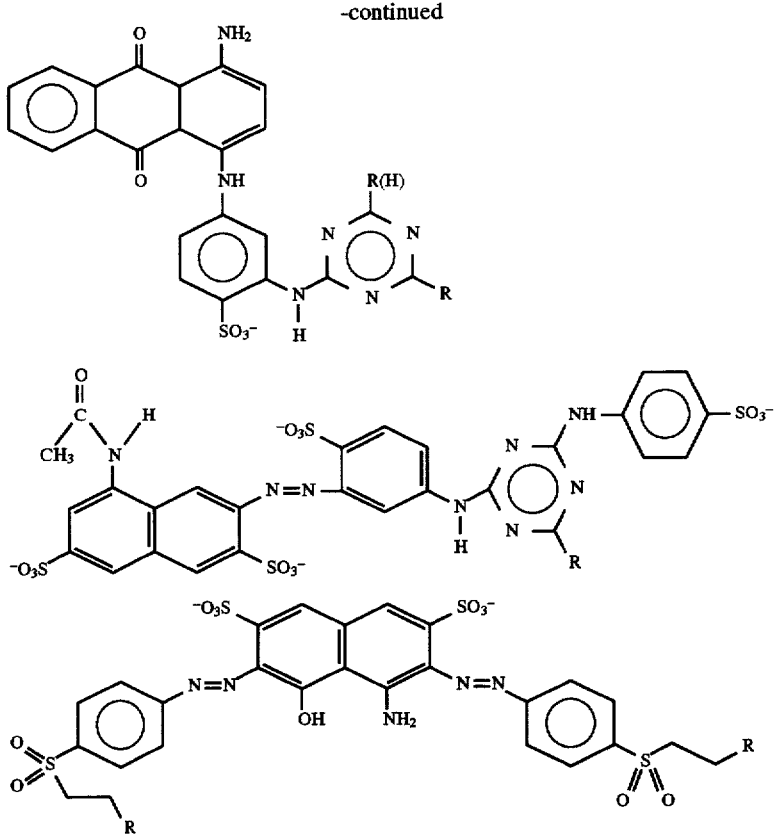

In the above four amphiphilic dye structures, the hydrophobe group(s) R may be selected from such substituents as depicted below (although not limited to these examples), where n is within the range of 1 to 20:

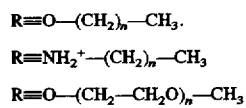

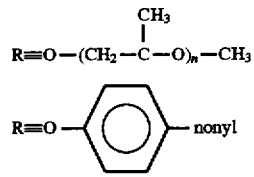

The amphiphilic dye is preferably employed in an ink-jet ink composition at a concentration within the range of about 0.01 to 9 wt %. The amphiphilic dye should be employed at a concentration greater than its cmc in accordance with Moffatt '409, as described above, to achieve micelle formation. To ensure proper micellization, it is preferred that the amphiphilic dye be employed at a concentration of 1.1 times the cmc. The micelles formed by the amphiphilic dyes in the practice of the invention preferably range from about 0.1 to 500 nm in radius. Thus, the concentration of the amphiphilic dye employed depends upon its cmc as well as the desired color intensity.

It is important to monitor the pH of an ink-jet ink employing the present amphiphilic dyes, just as with any colorant. Specifically, if the pH is excessive, the amphiphilic dye loses its waterfastness. However, if the pH is too low, the amphiphilic dye is insoluble. The appropriate pH range for an amphiphilic dye comprising Reactive Black 5 covalently attached to pentylamine is about 7 to 9, for example. It is considered to be routine endeavor for one having skill in the art to determine the appropriate pH range for a particular amphiphilic dye. Such experimentation is not considered to be undue.

By employing amphiphilic dyes in the practice of the invention, one may capitalize upon the benefits of dye-based colorants, namely stability of dispersion and commercial availability, while achieving some of the typical benefits of pigment-based colorants, namely edge acuity, waterfastness, and lightfastness. This is accomplished by employing the present method substantially in lieu of adding surfactants to the dye-based ink-jet inks for bleed alleviation.

Examples of suitably-employed reactive groups are in the following two reactive dye structures, which are dichlorotriazine (a difunctional triazine) and monochlorotriazine (a monofunctional triazine) as commercially available from ICI under the trade designations Procion and Procion H, respectively:

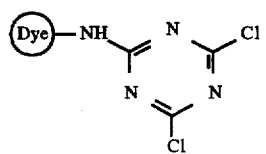

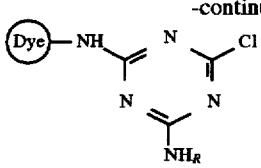

The following depicts 2-ethanosulfosulfonate, the reactive group employed with the reactive dye structure commercially known as Remazol, which is available from Hoechst:

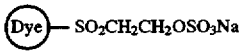

Also suitable is trichlorotriazine, the reactive group employed in the commercially-available reactive dye structures known as Reacton and Drimaren, respectively available from Ciba-Giegy and Sandoz:

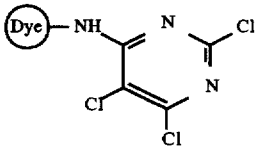

The following reactive groups are associated with reactive dye structures commercially known as Levafix E, Levafix P, and Levafix, each available from Bayer and having the following respective structures:

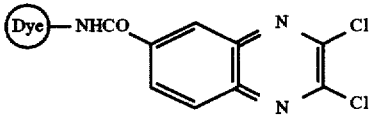

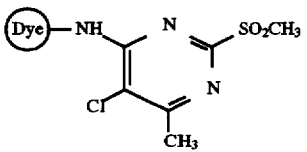

Another reactive group for a reactive dye (a difunctional diazine) that may be suitably employed in the practice of the invention has the following general formula, which is commercially available under the trade designation Reactofil from Ciba-Geigy:

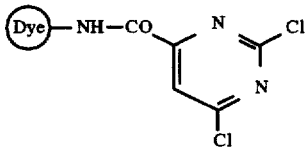

The following also represents a suitably-employed reactive dye structure that is commercially available under the trade designation Primazin P from BASF:

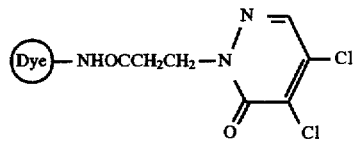

Two additional examples of suitably-employed reactive dye structures are commercially available under the trade designations Elisiane and Solidazol, which are respectively available from Fancolor and Cassella, and are as follows:

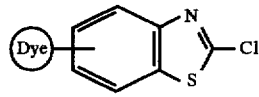

Examples of commercially-available reactive dyes that may be employed include, but are not limited to, Reactive Black 5, Reactive Black 31, Reactive Blue 7, Reactive Blue 19, Reactive Blue 27, Reactive Blue 38, Reactive Blue 71, Reactive Blue 77, Reactive Red 21, Reactive Red 49, Reactive Red 106, Reactive Red 180, Reactive Red 413, Projet Magenta-1T (commercially available from Seneca and having a proprietary composition), Reactive Yellow 37, Reactive Yellow 57, Brilliant Yellow VS 46LS, Intracon Yellow VS-6R, Intracon Brilliant Yellow 6G-E, and Reactive Yellow 160. It is contemplated that any commercially-available reactive dye suitable for ink-jet ink compositions may be employed in the practice of the invention.

In summary, the reactive groups on reactive dyes may comprise difunctional and trifunctional triazines, difunctional diazines (nitrogen atoms para to each other), monofunctional, difunctional, and trifunctional diazines (nitrogen atoms ortho to each other), β-(X)ethylsulfone, and α,β-di(X)alkyl, where the functionality (or X) is selected from the group consisting of $Cl^-$, $Br^-$, $F^-$, $I^-$, $SP_4^{-2}$, $HSO_4^-$, $H_2PO_4^-$, $HPO_4^-$, $PO_4^{-3}$, $CH_3SO_3^-$, $OTs^-$, $YC_6H_5COO^-$.

Turning now to the hydrophobes bonded to reactive dyes in the practice of the invention, specific examples of anionic substituents for suitable hydrophobes include, but are not limited to, the following: carboxylate groups (R—(COO—)$_n$M$^{n+}$); sulfocarboxylate groups [(SO$_3^-$)—R—COO—M$^{2+}$]; phosphonocarboxylate groups [(H$_{3-n}$O$_3$PO—R—COO—M$^{(n+1)+}$]; sarcoside groups (R—CON(CH$_3$)—CH$_2$COO—M$^+$); sulfate groups (R—OSO$_3$—M$^+$); polyoxyethylene sulfate groups (R—(OCH$_2$CH$_2$)$_n$—OSO$_3$—M$^+$); sulfonate groups (R—SO$_3$—M$^+$); polyoxyethylene sulfonate groups (R—(OCH$_2$CH$_2$)$_n$—SO$_3$—M$^+$); and phosphate groups (R—OPO$_3$H$_{3-n}$—M$^{n+}$), where M represents the cationic species associated with the amphiphile. Alginates and bile salts may also be employed. Additional examples of hydrophobes include 1-hydroxy-2-sulfonate groups, benzene sulfonate groups, and naphthalene sulfonate groups, respectively represented by the following general formulas:

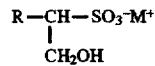

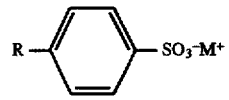

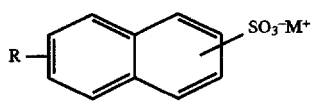

Other specific examples of hydrophobes include carboxylates such as sodium stearate and oleates.

Other hydrophobes can have the substituents depicted in, but are not limited to those in, Table 1 below. These represent the broad class of cationic amphiphiles useful in the practice of the invention.

TABLE 1

Chemical Structure of Hydrophilic Groups for Example Cationic Amphiphiles

| Chemical Structure<br>R = long hydrophobic tail<br>$R_1$, $R_2$, $R_3$ = hydrogen or short alkyl chain | Name of Class |
|---|---|
| $R-\overset{R_1}{\underset{R_3}{N^+}}-R_2 X^-$ | Ammonium |
| $R-\overset{R_1}{\underset{R_2}{S^+}}-R_1 X^-$ | Sulfonium |
| $R-\overset{R_1}{\underset{R_3}{P^+}}-R_2 X^-$ | Phosphonium |
| $R-N^+\!\!\bigcirc\!\! \ X^-$ (pyridinium ring) | Pyridinium |
| $R-N^+$ (naphthalene-fused) $X^-$ | Quinolinium |
| $R-{}^+N\!\!\bigcirc\!\!-\!\!\bigcirc\!\!N^+-R_1 \ X^{2-}$ | Viologen |

Non-ionic substituents to the hydrophobe include the following classes of compounds, but are not limited thereto: water-soluble STARBURST dendrimers, which are branched polyethylene amines available from Polysciences, Inc., and the like; polyethers, which include such compounds as ethylene glycol n-butyl ether, diethylene glycol n-butyl ether, diethylene glycol n-hexyl ether, triethylene glycol n-butyl ether, and propylene glycol isobutyl ether; the TRITONS, such as TRITON X-100, which are nonyl phenyl polyethylene oxide surfactants available from Rohm & Haas Co.; the PLURONICS and PLURAFACS, which are polyethylene oxide and polypropylene oxide block co-polymers from BASF; the SURFYNOLS, which are acetylenic polyethylene oxide surfactants available from Air Products & Chemicals, Inc.; the TERGITOLS, which are alkyl polyethylene oxides available from Union Carbide; and BRIJ, which are also alkyl polyethylene oxides available from ICI America.

SURFYNOL 465 is represented by the following general formula:

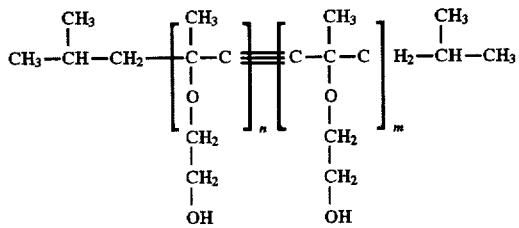

where n+m=10.

Additional classes of hydrophobic substituents are represented by the following general formulas in Table 2.

TABLE 2

Chemical Structure of Hydrophilic Groups for Example Nonionic Amphiphiles

| Chemical Structure<br>R = long hydrophobic tail<br>$R_1$, $R_2$ = hydrogen or short alkyl chain | Name of Class |
|---|---|
| $[R-(OCH_2CH_2)_n-OH]$<br>$[R-(OCH_2CH_2CH_2)_n-OH]$<br>$[R-COO-(CH_2CH_2O)_n-H]$ | polyoxyethylene alcohol<br>polyoxypropylene alcohol<br>polyoxyethylene ester |
| $R-COO-\underset{OH}{CH}-CH_2OH$ | glycerol monoester |
| $R-COO-CH_2\underset{CH_2OH}{\overset{CH_2OH}{C}}CH_2OH$ | pentaerythritol monoester |
| $R-COOCH_2-CH\overset{O}{\diagdown}CH_2$<br>$OH-CH\diagup\ \diagdown CH-OH$<br>$\underset{OH}{CH}$ | sorbitan monoester |
| $R-(CH_2CH_2O)n$ | crown ether |
| $R-S-R_1$<br>$\downarrow$<br>$O$ | sulfoxide |
| $R-S-(CH_2)_n-OH$<br>$\downarrow$<br>$O$ | sulfinyl alkanol |
| $R-S-(CH_2CH_2O)_n-H$ | polyoxyethylene thioether |
| $R-\overset{R_1}{\underset{R_2}{N^+}}\!\!\rightarrow\!O^-$ | amine oxide |
| $R-(CH_2CH_2NH)_n$ | azacrown |
| $R-\overset{R_1}{\underset{R_2}{P^+}}\!\!\rightarrow\!O^-$ | phosphine oxide |
| $R-CONCH_2\overset{CH_3}{\underset{OH}{C}H}\overset{OH}{C}H\overset{OH}{C}HCH_2OH$ | N-methylglucamine |

Zwitterionic substituents to the hydrophobe may be used in the practice of the invention. Examples include, but are not limited to, the following: N,N-dimethyl-N-dodecyl amine oxide (NDAO), N,N-dimethyl-N-tetradecyl amine oxide (NTAO), N,N-dimethyl-N-hexadecyl amine oxide (NHAO), N,N-dimethyl-N-octadecyl amine oxide (NOAO), N,N-dimethyl-N-(Z-9-octadecenyl)-N-amine oxide (OOAO), amines (1°, 2°, and 3°), diamines, and morpholines. NDAO has a molecular weight of 229 based upon the following general formula:

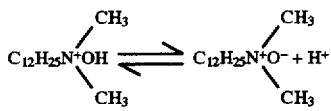

In place of the $C_{12}H_{25}$-moiety, any R moiety may be used. Thus, the general structures of NTAO (molecular weight =257), NHAO (molecular weight=285), NOAO (molecular weight=313), and OOAO (molecular weight=311) may be derived using the above formula for NDAO.

Other examples include sulfobetaines, which have the following general formula:

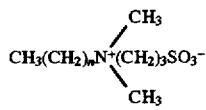

Where n=11, the compound is denoted SB3-12, and where n=15, the compound is denoted SB3-16.

Other examples include C betaine, N betaine, triglycine, N,N-dialkyl taurine, and phosphatidylcholine. Another example is N-dodecyl-N,N-dimethyl glycine. Yet other examples include phosphates, phosphites, phosphonates, lecithins or the like, and phosphate esters such as phosgomyeline, given by the following general formula:

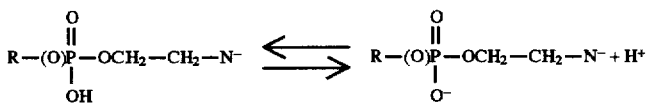

Other similar compounds include phosphoglycerides, such as phosphatidylethamines, phosphatidylcholines, phosphatidyl serines, phosphatidylinositols, and B'-O-lysylphosphatidylglycerols.

Other examples that may be employed in the practice of the invention aside from those mentioned above include chelates, structures having twin tails, monochlorazines, and 2-ethanatosulfones.

The amphiphilic dye formulated in the practice of the invention is combined with a liquid vehicle to form the present ink-jet ink compositions, with the liquid vehicle comprising water and water-soluble organic solvents. Examples of water-soluble organic solvents that may be employed include, but are not limited to, glycols such as ethylene glycol, diethylene glycol, triethylene glycol, tetraethylene glycol, propylene glycol, polyethylene glycol, polypropylene glycol, and derivatives thereof; diols such as butanediol, pentanediol, hexanediol, and homologous diols; glycol esters such as propylene glycol laurate; mono- and diglycol ethers such as cellosolves, including ethylene glycol monobutyl ether, diethylene glycol ether such as the carbitols, diethylene glycol mono ethyl, butyl, hexyl ethers, propylene glycol ether, dipropylene glycol ether, and triethylene glycol ether; long chain alcohols such as butyl alcohol, pentyl alcohol, and homologous alcohols; and other solvents such as sulfolane, ketones, lactones such as γ-butyrolactone, lactams such as N-pyrrolidone and N-(2-hydroxyethyl)pyrrolidone, and glycerols and their derivatives.

Other components that may be included in the present ink-jet ink compositions include biocides, buffers, and processing aids, which are commonly employed additives in ink-jet ink compositions. Any of the biocides commonly employed in ink-jet inks may be employed in the inks of the present invention, such as NUOSEPT 95, available from H üls America (Piscataway, N.J.); PROXEL GXL, available from ICI America (Wilmington, Del.); and glutaraldehyde, available from Union Carbide Company (Bound Brook, N.J.) under the trade designation UCARCIDE 250. PROXEL GXL is the preferred biocide. Likewise, any of the buffers commonly employed in ink-jet inks may be employed in the present inks, such as Trizma Base, which is available from Aldrich Chemical, and 4-morpholine ethane sulfonic acid.

Preferably, an ink-jet ink composition employing 5 wt % of the preferred amphiphilic dye (Reactive Black 5 covalently attached to a pentylamine dimer) includes 6 wt % 2-pyrrolidone, sufficient ammonium hydroxide to achieve a pH of about 8.5, 0.3 wt % of the biocide UCARCIDE, and the balance water.

INDUSTRIAL APPLICABILITY

The ink composition disclosed herein is expected to find use in all forms of ink-jet printing processes, including continuous stream, piezoelectric drop-on-demand, bubble jet or, most particularly, thermal ink-jet processes. Moreover, the present ink-jet ink compositions are suitable for printing onto the various types of print media employed in ink-jet printing, including paper, transparencies, and textile media.

Thus, there has been disclosed an ink-jet ink composition as well as a method for reducing bleed between inks employed in ink-jet printing. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. An ink-jet ink composition for ink-jet printing comprising an aqueous liquid vehicle and at least one amphiphilic dye, said at least one amphiphilic dye comprising a plurality of amphiphilic dye molecules, each of said amphiphilic dye molecules consisting essentially of a reactive dye molecule covalently attached to a hydrophobe molecule, said amphiphilic dye being present in said ink-jet ink composition in an amount that is at least equal to its critical micelle concentration.

2. The ink-jet ink composition of claim 1 wherein said at least one amphiphilic dye is present in said ink-jet ink composition at a concentration within the range of about 0.01 to 9 wt %.

3. The ink-jet ink composition of claim 1 wherein said hydrophobe molecule has a substituent selected from the group consisting of anionic amphiphiles, cationic amphiphiles, non-ionic amphiphiles, and zwitterionic amphiphiles.

4. The ink-jet ink composition of claim 3 wherein said anionic amphiphiles are selected from the group consisting of carboxylates, sulfocarboxylates, phosphonocarboxylates, sarcosides, sulfates, sulfonates, phosphates, alginates, and bile salts.

5. The ink-jet ink composition of claim 3 wherein said cationic amphiphiles are selected from the group consisting of ammoniums, sulfoniums, phosphoniums, pyridiniums, quinoliniums, and viologens.

6. The ink-jet ink composition of claim 3 wherein said non-ionic amphiphiles are selected from the group consisting of water-soluble polyethylene amines, polyethers, polyethylene oxides, acetylenic backboned polyethylene oxides, alcohols, esters, crown ethers, sulfoxides, sulfinyl alkanols, thioethers, amine oxides, azacrowns, phosphine oxides, and N-methylglucamines.

7. The ink-jet ink composition of claim 3 wherein said zwitterionic amphiphiles are pH-sensitive compounds and are selected from the group consisting of N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadecenyl)-N-amine oxide, amines, diamines, morpholines, N-dodecyl-N,N-dimethyl glycine, sulfobetaines, phosphates, phosphites, phosphonates, lecithins, phosphate esters, and phosphoglycerides.

8. The ink-jet ink composition of claim 1 wherein said hydrophobe molecule is selected from the group consisting of an amine and an alcohol, wherein said hydrophobe molecule has a carbon chain length within the range of about 5 to 10.

9. The ink-jet ink composition of claim 1 wherein said reactive dye molecule is a water-soluble dye selected from the group consisting of Reactive Black 5, Reactive Black 31, Reactive Blue 4, Reactive Blue 7, Reactive Blue 19, Reactive Blue 27, Reactive Blue 38, Reactive Blue 71, Reactive Blue 77, Reactive Red 4, Reactive Red 21, Reactive Red 49, Reactive Red 106, Reactive Red 180, Reactive Red 413, Reactive Yellow 37, Reactive Yellow 57, Reactive Yellow 160, and Reactive Orange 16.

10. The ink-jet ink composition of claim 1 wherein said aqueous liquid vehicle comprises at least one organic solvent and water, said at least one organic solvent selected from the group consisting of glycols, diols, glycol esters, glycol ethers, long chain alcohols, sulfolane, ketones, lactones, lactams, and glycerols, and derivatives thereof and mixtures thereof.

11. The ink-jet ink composition of claim 1 wherein said amphiphilic dye comprises Reactive Black 5 covalently attached to pentylamine.

12. The ink-jet ink composition of claim 11 wherein said ink-jet ink composition comprises (a) an amphiphilic dye comprising Reactive Black 5 covalently attached to pentylamine; (b) 2-pyrrolidone; and (c) water.

13. A method for reducing bleed between inks employed in ink-jet printing, said method comprising the steps of printing a first ink on a medium followed by substantially simultaneously printing a second ink adjacent thereto, each said ink comprising an aqueous liquid vehicle and at least one amphiphilic dye, said at least one amphiphilic dye comprising a plurality of amphiphilic dye molecules, each of said amphiphilic dye molecules consisting essentially of a reactive dye molecule covalently attached to a hydrophobe molecule, said amphiphilic dye being present in each said ink in an amount that is at least equal to its critical micelle concentration, whereby invasion of one color by another is avoided.

14. The method of claim 13 wherein said amphiphilic dye is present in each said ink at a concentration within the range of about 0.01 to 9 wt %.

15. The method of claim 13 wherein said hydrophobe has a substituent selected from the group consisting of anionic amphiphiles, cationic amphiphiles, non-ionic amphiphiles, and zwitterionic amphiphiles.

16. The method of claim 15 wherein said anionic amphiphiles are selected from the group consisting of carboxylates, sulfocarboxylates, phosphonocarboxylates, sarcosides, sulfates, sulfonates, phosphates, alginates and bile salts.

17. The method of claim 15 wherein said cationic amphiphiles are selected from the group consisting of ammoniums, sulfoniums, phosphoniums, pyridiniums, quinoliniums, and viologens.

18. The method of claim 15 wherein said non-ionic amphiphiles are selected from the group consisting of water-soluble polyethylene amines, polyethers, polyethylene oxides, acetylenic backboned polyethylene oxides, alcohols, esters, crown ethers, sulfoxides, sulfinyl alkanols, thioethers, amine oxides, azacrowns, phosphine oxides, and N-methylglucamines.

19. The method of claim 15 wherein said zwitterionic amphiphiles are pH-sensitive compounds and are selected from the group consisting of N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadecenyl)-N-amine oxide, amines, diamines, morpholines, N-dodecyl-N,N-dimethyl glycine, sulfobetaines, phosphates, phosphites, phosphonates, lecithins, phosphate esters, and phosphoglycerides.

20. The method of claim 13 wherein said hydrophobe molecule is selected from the group consisting of an amine and an alcohol, wherein said hydrophobe molecule has a carbon chain length within the range of about 5 to 10.

21. The method of claim 13 wherein said reactive dye molecule is a water-soluble dye selected from the group consisting of Reactive Black 5, Reactive Black 31, Reactive Blue 4, Reactive Blue 7, Reactive Blue 19, Reactive Blue 27, Reactive Blue 38, Reactive Blue 71, Reactive Blue 77, Reactive Red 4, Reactive Red 21, Reactive Red 49, Reactive Red 106, Reactive Red 180, Reactive Red 413, Reactive Yellow 37, Reactive Yellow 57, Reactive Yellow 160, and Reactive Orange 16.

22. The method of claim 13 wherein said aqueous liquid vehicle comprises at least one organic solvent and water, said at least one organic solvent selected from the group consisting of glycols, diols, glycol esters, glycol ethers, long chain alcohols, sulfolane, ketones, lactones, lactams, and glycerols, and derivatives thereof and mixtures thereof.

* * * * *